US011895076B2

(12) United States Patent
Goslar

(10) Patent No.: US 11,895,076 B2
(45) Date of Patent: *Feb. 6, 2024

(54) ELECTRONIC MESSAGING PLATFORM THAT ALLOWS USERS TO EDIT AND DELETE MESSAGES AFTER SENDING

(71) Applicant: Myabuy, LLC, Wilmington, DE (US)

(72) Inventor: Joel Goslar, Chicago, IL (US)

(73) Assignee: Myabuy, LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 18/050,221

(22) Filed: Oct. 27, 2022

(65) Prior Publication Data

US 2023/0075310 A1 Mar. 9, 2023

Related U.S. Application Data

(63) Continuation of application No. 17/035,352, filed on Sep. 28, 2020, now Pat. No. 11,516,169, which is a
(Continued)

(51) Int. Cl.
*H04L 51/52* (2022.01)
*H04L 51/42* (2022.01)
*H04L 51/04* (2022.01)
*H04L 51/56* (2022.01)
*H04L 51/212* (2022.01)
*H04L 51/18* (2022.01)
(Continued)

(52) U.S. Cl.
CPC ............. *H04L 51/42* (2022.05); *H04L 51/04* (2013.01); *H04L 51/063* (2013.01); *H04L 51/08* (2013.01); *H04L 51/18* (2013.01); *H04L 51/212* (2022.05); *H04L 51/56* (2022.05); *G06F 8/654* (2018.02); *G06Q 10/107* (2013.01); *H04L 41/06* (2013.01); *H04L 63/101* (2013.01)

(58) Field of Classification Search
CPC ......... H04L 51/22; H04L 51/18; H04L 51/10; H04L 67/2828; H04L 67/306; G06Q 10/107; G06F 40/103
See application file for complete search history.

(56) References Cited

U.S. PATENT DOCUMENTS 9,237,121 B1 * 1/2016 Graham ................ H04L 51/212
2004/0024826 A1 * 2/2004 Halahmi ................ H04L 51/04
709/206
(Continued)

FOREIGN PATENT DOCUMENTS

CN 1598848 3/2005
CN 101989335 3/2011
(Continued)

*Primary Examiner* — Barbara B Anyan
(74) *Attorney, Agent, or Firm* — Klarquist Sparkman, LLP

(57) ABSTRACT

Systems, methods, and computer media for manipulating electronic messages are provided herein. A system for editing electronic messages can include at least one processor, and an application. The application can be configured to, when executed by the at least one processor, send an electronic message from a sender messaging account to a recipient messaging account, edit the message after it has been sent to the recipient messaging account to create an edited message and replace the sent message with the edited message in a same relative location of the sent message in the recipient's inbox, or delete the sent message or the edited message from the recipient's inbox.

18 Claims, 14 Drawing Sheets

Related U.S. Application Data continuation of application No. 16/384,285, filed on Apr. 15, 2019, now Pat. No. 10,791,083, which is a continuation of application No. 15/232,567, filed on Aug. 9, 2016, now Pat. No. 10,291,568.

(51) Int. Cl.

| | |
|---|---|
| *H04L 51/063* | (2022.01) |
| *H04L 51/08* | (2022.01) |
| *H04L 9/40* | (2022.01) |
| *G06F 8/654* | (2018.01) |
| *H04L 41/06* | (2022.01) |
| *G06Q 10/107* | (2023.01) |

(56) References Cited

U.S. PATENT DOCUMENTS

| | | | |
|---|---|---|---|
| 2005/0066009 A1 | 3/2005 | Keohane et al. | |
| 2005/0086313 A1* | 4/2005 | Lucas | B65F 1/068 |
| | | | 709/206 |
| 2007/0038702 A1* | 2/2007 | Taylor | G06Q 10/107 |
| | | | 709/206 |
| 2009/0282086 A1* | 11/2009 | Heimes | H04L 51/42 |
| | | | 715/752 |
| 2010/0250579 A1* | 9/2010 | Levow | G06Q 10/107 |
| | | | 707/769 |
| 2011/0029625 A1 | 2/2011 | Yuan et al. | |
| 2011/0191433 A1* | 8/2011 | Du | H04L 51/56 |
| | | | 709/206 |
| 2016/0050177 A1 | 2/2016 | Cue et al. | |
| 2016/0142350 A1* | 5/2016 | Mutha | H04L 51/18 |
| | | | 709/206 |
| 2017/0078234 A1* | 3/2017 | Massand | H04L 51/08 |

FOREIGN PATENT DOCUMENTS

| | | |
|---|---|---|
| CN | 104104588 | 10/2014 |
| CN | 105208532 | 12/2015 |
| CN | 105827499 | 8/2016 |
| EP | 1609101 | 12/2005 |

* cited by examiner

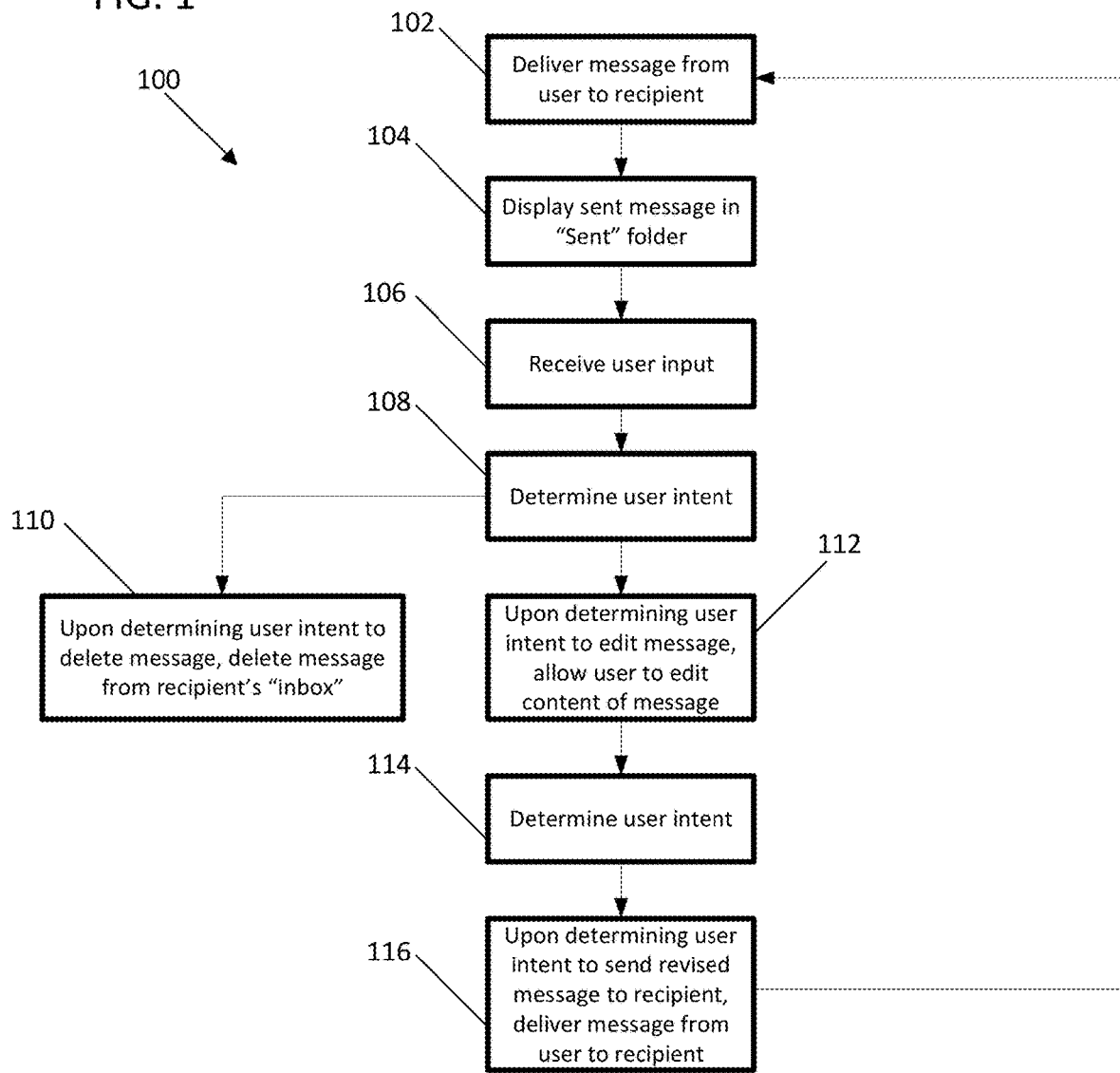

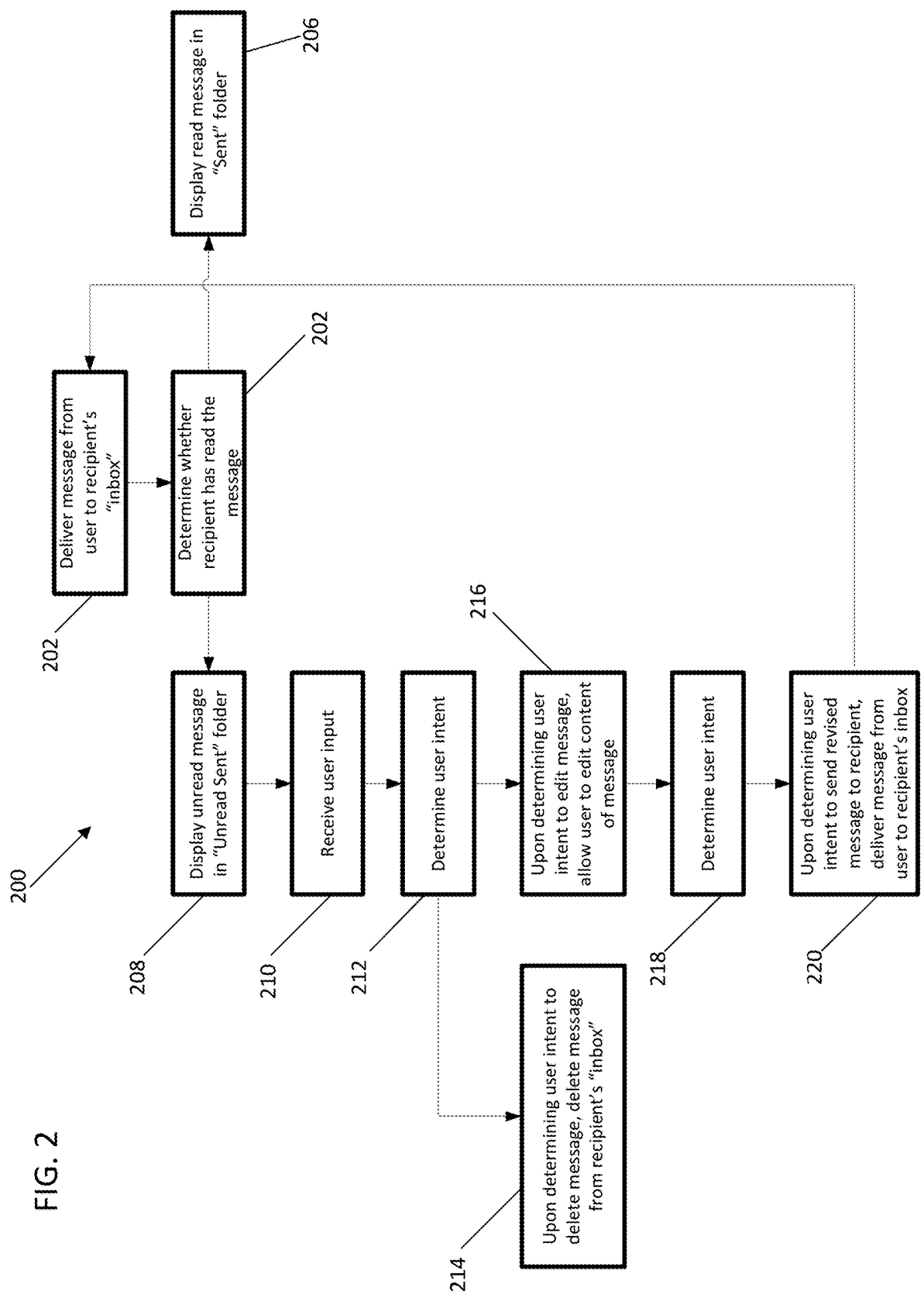

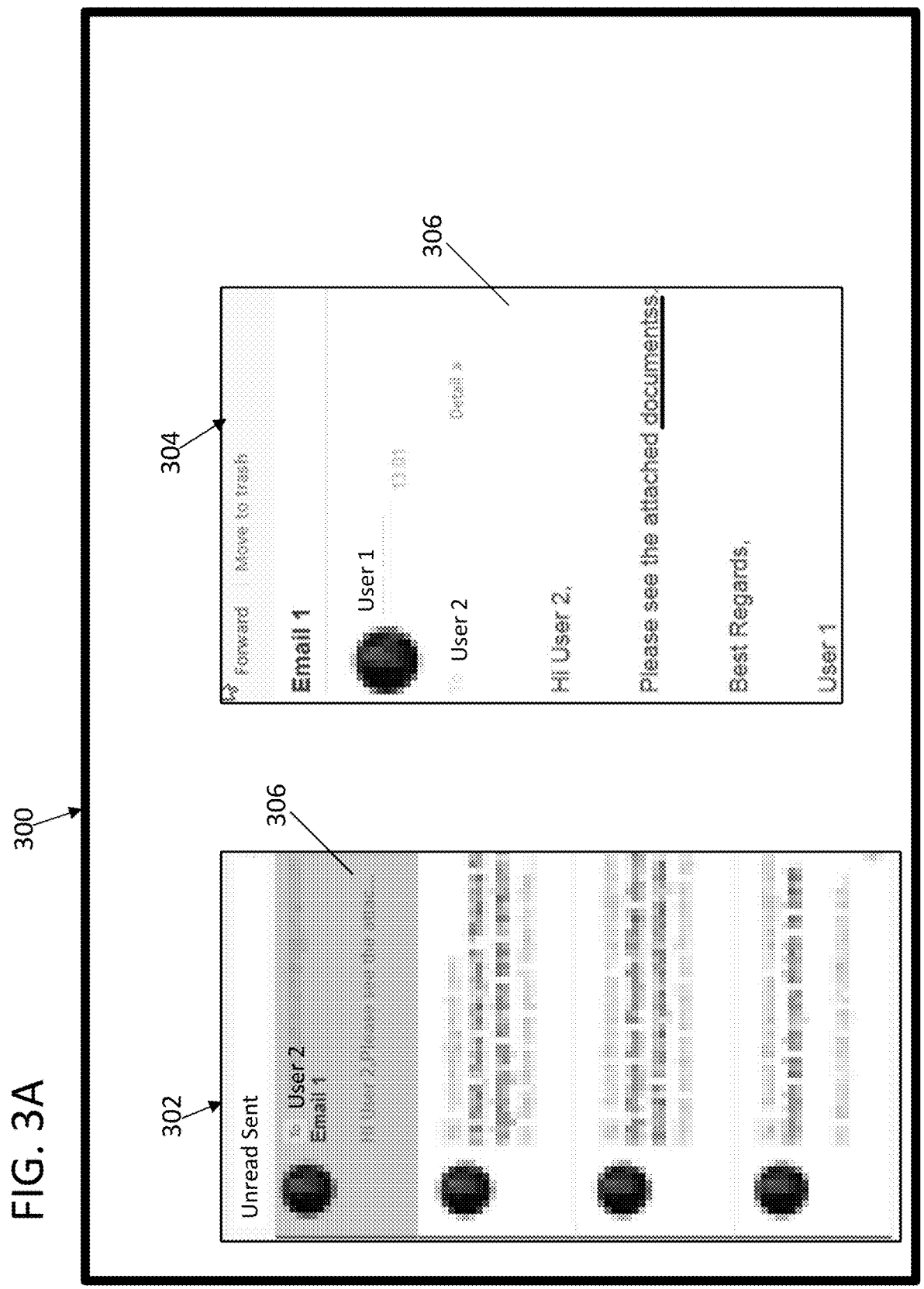

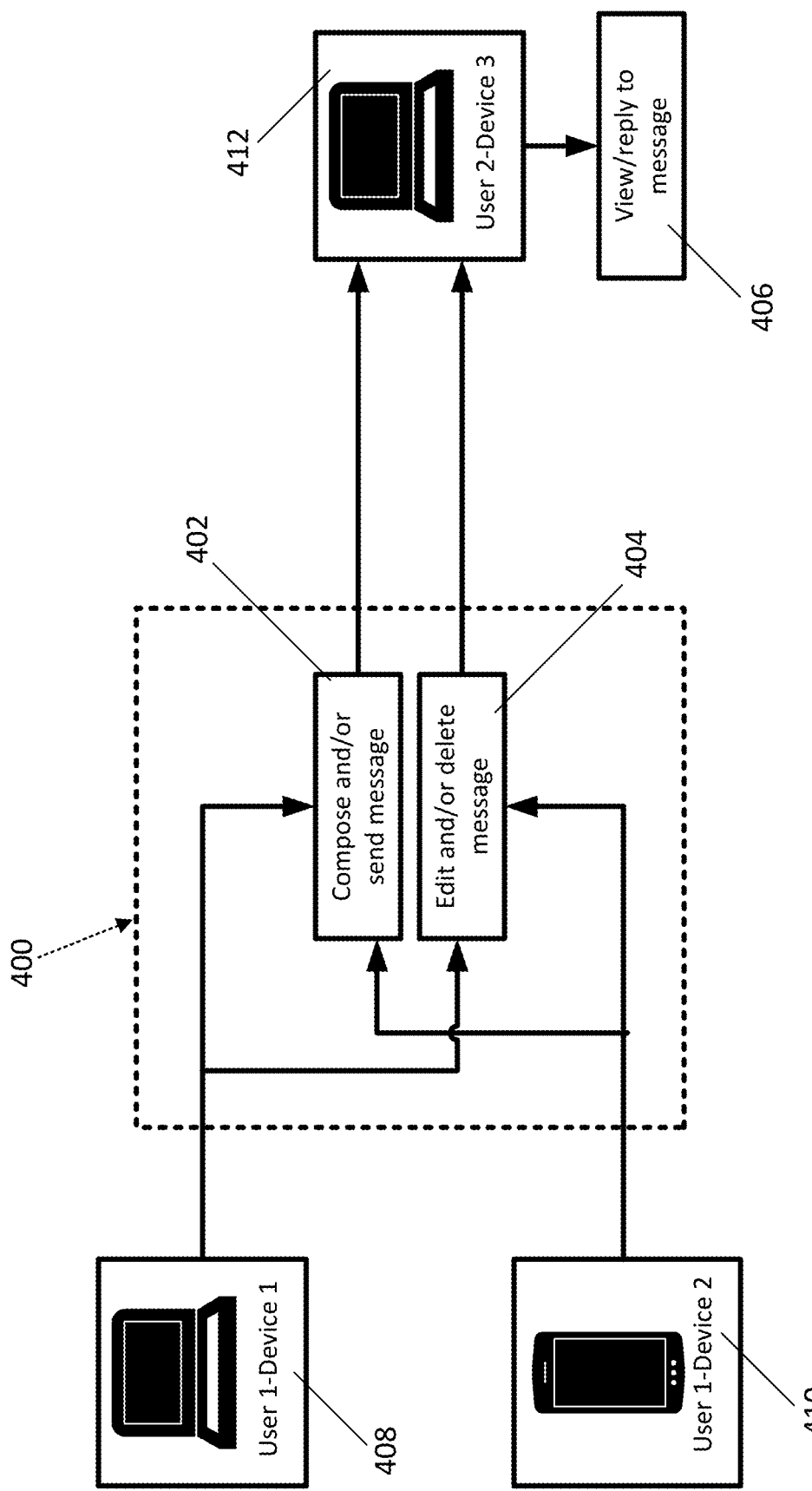

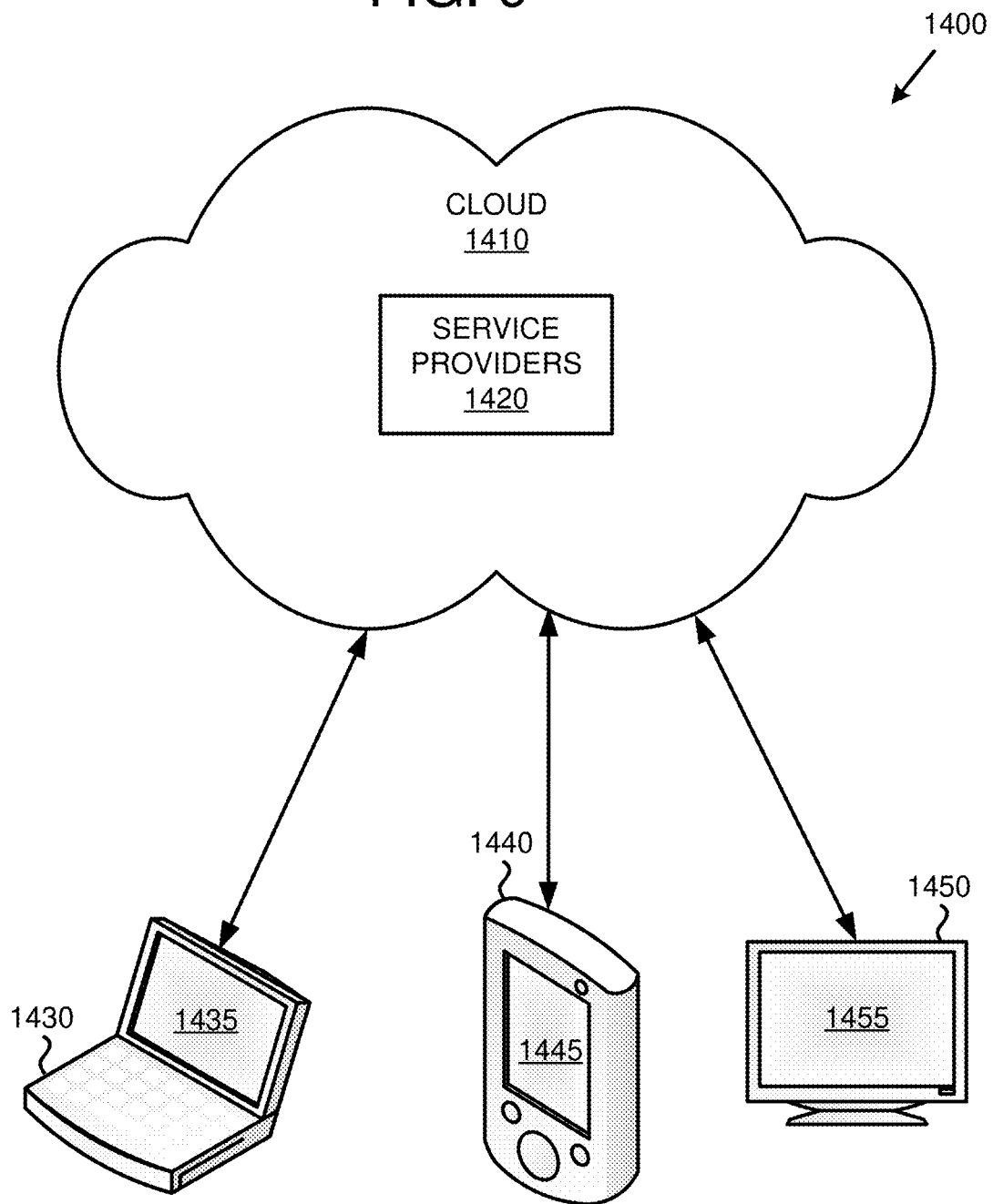

ELECTRONIC MESSAGING PLATFORM THAT ALLOWS USERS TO EDIT AND DELETE MESSAGES AFTER SENDING

CROSS-REFERENCE TO RELATED APPLICATIONS

This application is a continuation of U.S. patent application Ser. No. 17/035,352, filed Sep. 28, 2020, which is a continuation of U.S. application Ser. No. 16/384,285, filed Apr. 15, 2019, issued as U.S. Pat. No. 10,791,083, which is a continuation of U.S. application Ser. No. 15/232,567, filed Aug. 9, 2016, issued as U.S. Pat. No. 10,291,568, each of which is incorporated by reference herein.

FIELD

This disclosure is directed to electronic messaging, as well as related devices, systems, and methods.

BACKGROUND

Electronic messaging such as email, instant messages, text messages, etc. have become commonplace. Electronic messaging is used, for example, for communicating personal and/or business information. Despite its advantages, electronic messaging has shortcomings which can adversely affect communication and relationships.

SUMMARY

Examples described herein relate to managing and/or editing sent electronic messages, as well as related devices, systems, and methods.

In one example, a system for editing an electronic message comprises at least one processor, and an application configured to, by the at least one processor, send an electronic message from a sender to a recipient, edit the message after it has been sent to the recipient to create an edited message, retain a relative location of the message in the recipient's inbox while the edited message is created, send the edited message from the sender to the recipient, and place the edited message in the relative location of the message in the recipient's inbox.

In some examples, the application is further configured to edit the message by adding at least one attachment to or by removing at least one attachment from the message. In some examples, the application is further configured to edit the message by adding at least one additional recipient to the message. In some examples, the application is further configured to edit the message by editing a subject line of the message.

In some examples, the application is further configured to display information about the recipient while the sender is composing, editing, or replying to the message. In some of those examples, the information about the recipient comprises personal information about the recipient. In other such examples, the information about the recipient comprises notes about the recipient that were previously entered by the sender. In other such examples, the information about the recipient comprises information about past or upcoming meetings between the sender and the recipient.

In some examples, the application is a messaging application on a smartphone. In some examples, the application is a messaging application on a computer.

In another example, a method of editing an electronic message is provided. The method comprises sending an electronic message from a first device of a first user to a second user, editing the message from a second device of the first user, and sending the edited message from the second device of the first user to the second user.

In some examples, editing the message includes adding at least one attachment to or removing at least one attachment from the message. In other examples, editing the message includes adding at least one additional recipient to the message.

In some examples, the first device is a computer, and the second device is a smartphone. In other examples, the first device is a smartphone, and the second device is a computer. In some examples, the message is an email message.

In another example, one or more computer-readable storage media storing computer-executable instructions for editing an electronic message is provided. The computer-readable storage comprises instructions for sending a message from a sender to a recipient, instructions for editing the message after the message has been sent to create an edited message, instructions for retaining a relative location of the message in the recipient's inbox while the edited message is created, instructions for sending the edited message from the sender to the recipient, and instructions for placing the edited message in the relative location of the message in the recipient's inbox.

In some examples, the instructions for editing the message include instructions for adding at least one attachment to or removing at least one attachment from the message. In some examples, the instructions for editing the message include instructions for adding at least one recipient to the message. In some examples, the instructions for editing the message include instructions for editing a subject line of the message.

The foregoing and other objects, features, and advantages of the invention will become more apparent from the following detailed description, which proceeds with reference to the accompanying figures.

BRIEF DESCRIPTION OF THE DRAWINGS

FIG. 1 is a flowchart illustrating an example method of manipulating electronic messages.

FIG. 2 is a flowchart illustrating an example method of manipulating electronic messages.

FIGS. 3A-3F are examples of a user interface demonstrating various features of a system capable of manipulating electronic messages.

FIG. 4 is a block diagram of an example system capable of manipulating electronic messages.

FIG. 9 is an example cloud-supported environment that can be used in conjunction with the technologies described herein.

DETAILED DESCRIPTION

General Considerations

Figure 3B:
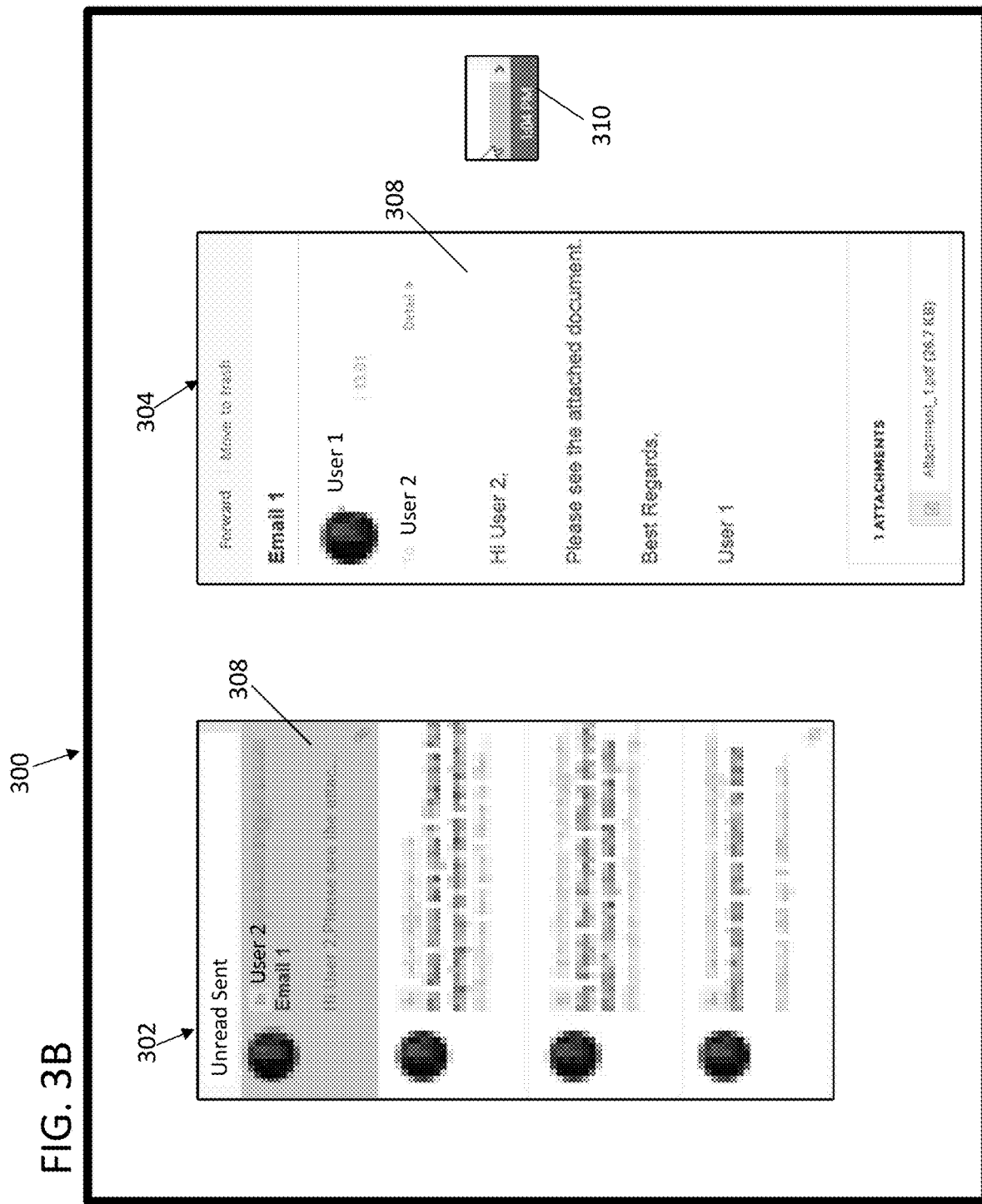

This disclosure is set forth in the context of representative embodiments that are not intended to be limiting in any way.

As used in this application and in the claims, the singular forms "a," "an," and "the" include the plural forms unless the context clearly dictates otherwise. Additionally, the term "includes" means "comprises."

The systems, methods, and apparatus disclosed herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Furthermore, any features or aspects of the disclosed embodiments can be used in various combinations and sub-combinations with one another. Furthermore, as used herein, the term "and/or" means any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged, omitted, or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "receive," "produce," "identify," "transform," "modulate," "calculate," "predict," "evaluate," "validate," "apply," "determine," "generate," "associate," "select," "search," and "provide" to describe the disclosed methods. These terms are high-level abstractions of the actual operations that are performed. The actual operations that correspond to these terms can vary depending on the particular implementation and are readily discernible by one of ordinary skill in the art.

Some of the disclosed methods can be implemented with computer-executable instructions stored on one or more computer-readable storage media (e.g., non-transitory computer-readable media, such as one or more volatile memory components (such as DRAM or SRAM), or nonvolatile memory components (such as hard drives) and executed on a computer. Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially-available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well-known in the art are omitted. For example, it should be understood that the disclosed technology is not limited to any specific computer language or program. Likewise, the disclosed technology is not limited to any particular computer or type of hardware. Certain details of suitable computers and hardware are well-known and need not be set forth in detail in this disclosure.

Theories of operation, scientific principles, or other theoretical descriptions presented herein in reference to the systems, methods, and apparatus of this disclosure have been provided for the purposes of better understanding and are not intended to be limiting in scope. The systems, methods, and apparatus in the appended claims are not limited to those systems, methods, and apparatus that function in the manner described by such theories of operation.

EXAMPLES

Using the systems, methods, and computer-readable media described herein, a user can manipulate (e.g., edit and/or delete) an electronic message sent by the user to a recipient. The user can also determine whether an electronic message has been read by the recipient. Additionally, the user can view information about the recipient (e.g., position, relationship, past and/or upcoming meetings, etc.) while the user is composing the electronic message. These features, as well as others described herein, advantageously allow a user to more accurately, effectively, and efficiently communicate. The features can also reduce mistakes and/or save time, which in turn can reduce stress. Thus, the systems, methods, and computer-readable media described herein and make electronic messaging more enjoyable, efficient, and effective.

Electronic messages or messages referred to herein can comprise various formats and/or platforms including email, instant messages ("IM"), text messages (e.g., SMS), and the like. Although examples described herein may refer to a particular platform (e.g., email), the features of the examples can be adapted to one or more other platforms (e.g., IM, text messages, etc.).

Examples are described below with reference to FIGS. 1-9.

FIG. 1 illustrates a method 100 for manipulating electronic messages. A user can create a message to a recipient by composing a message and/or replying to a message to the user from the recipient. In process block 102, the message is delivered from the user to the recipient's "Inbox." In process block 104, the message is displayed, for example, in the user's "Sent" folder. Although not shown in FIG. 1, in other examples, the message can be displayed, for example, in the user's "Sent" folder if the recipient has read the message and/or in the user's "Unread Sent" folder if the recipient has not read the message.

The user can select a sent (read and/or unread) message to edit, for example, by clicking or tapping on the message. In process block 106, the user input can be received. In process block 108, the intent of the user can be determined. For example, it can be determined that the user wants to delete the message. This can be determined, for example, when the user clicks or taps a "Delete" or "Move to trash" icon or button. Upon determining the user's intent to delete the message, the message can be deleted (e.g., removed from the recipient's inbox or other location as though it were never sent), as illustrated in process block 110.

Alternatively, it can be determined that the user wants to edit the message. This can be determined, for example, when the user clicks or taps an "Edit" or "Revise" icon or button or when the user clicks or taps on the directly on the message such as on the "To" line, the "Subject" line, and/or in the "Body" of the message. Upon determining the user's intent to edit the message, the message can be edited, as illustrated in process block 112.

Once the message is edited, the user's intent can be determined, as illustrated in process block 114. Upon determining that the user's intent is to send the revised or edited message, the message is delivered to the recipient, as illustrated in process block 116. The user can repeat the process until satisfied with the message.

In some examples, the recipient is not notified of a change to the message. As such, the user can correct mistakes, delete inadvertent messages, etc. without alerting the recipient that such changes have occurred.

In some examples (e.g., FIG. 1), the user can edit messages that have been read by the recipient (e.g., messages in a "Sent" folder) and/or messages that have not been read by the recipient (e.g., messages in an "Unread Sent" folder). In other examples (e.g., FIG. 2), a user can only edit messages that has not been read by a recipient (e.g., messages in the "Unread Sent" folder).

FIG. 2 illustrates a method 200 for manipulating unread electronic messages. In process block 202, a message is delivered from a user to a recipient's inbox. In process block 204, a determination of whether the recipient has read the message is made. If the message has been read by the recipient, the message is displayed in the user's "Sent" folder, as illustrated in process block 206. If the message has not been read by the recipient, the message is displayed in the user's "Unread Sent" folder, as illustrated by process block 208.

The user can select an unread sent message to edit, for example, by clicking or tapping on the message. In process block 210, the user input can be received. In process block 212, the intent of the user can be determined. For example, it can be determined that the user wants to delete the message. This can be determined, for example, when the user clicks or taps a "Delete" or "Move to trash" icon or button. Upon determining the user's intent to delete the message, the message can be deleted (e.g., removed from the recipient's inbox or other location as though it were never sent), as illustrated in process block 214.

Alternatively, it can be determined that the user wants to edit the message. This can be determined, for example, when the user clicks or taps an "Edit" or "Revise" icon or button or when the user clicks or taps on the directly on the message such as on the "To" line, the "Subject" line, and/or in the "Body" of the message. Upon determining the user's intent to edit the message, the message can be edited, as illustrated in process block 214.

Once the message is edited, the user's intent can be determined, as illustrated in process block 218. Upon determining that the user's intent is to send the revised or edited message, the message is delivered to the recipient, as illustrated in process block 220.

A message can be manipulated in various ways. For example, a user can delete the message, add recipients (e.g., To, Cc; Bcc; etc.), edit (e.g., delete, change, and/or add) text in the body of the message, and/or add and/or removed attachments.

In some examples (e.g., methods 100, 200), the user's sent folder can show each message that is sent (e.g., each revised message or iteration) even though the recipient's inbox only shows the most recent message. For example, if the user sends a message to a recipient and then edits the message and resends it three additional times, the user's sent folder can display 4 messages (i.e., the original message and three edited messages) and the recipient's inbox will only show one message (i.e., the most recent version of the message). In other examples, the user's sent folder and the recipient's inbox can only display the most recent version of the message.

Figure 3C:
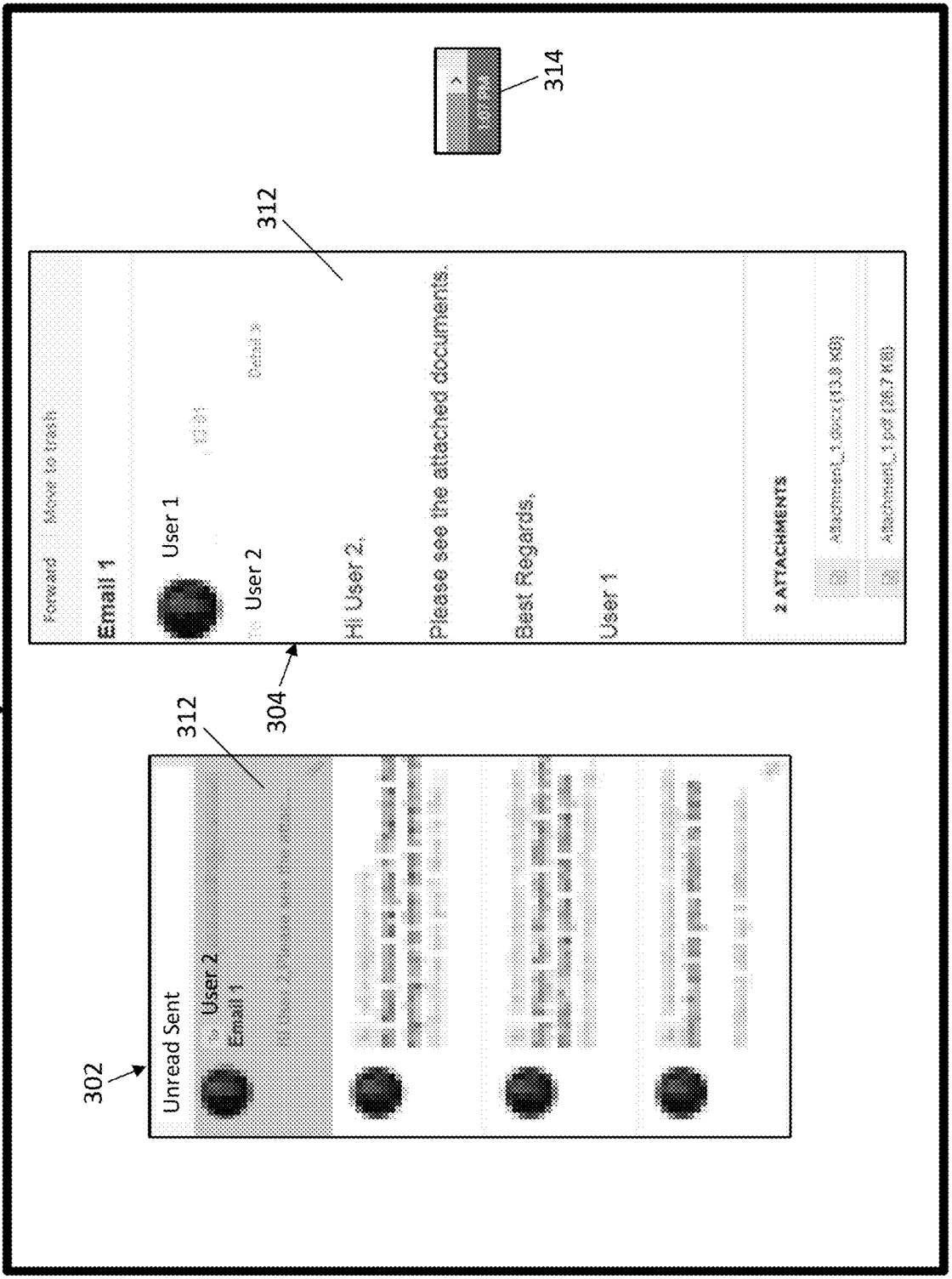

For example, FIGS. 3A-3C illustrate an example user interface 300. Referring to FIG. 3A, the user interface 300 can comprise an "Unread Sent" folder or list 302 and a message display 304. As shown in the folder 302 and the message display 304, User 1 sent a first message 306 to User 2 at 1:01 PM (i.e., displayed as 13:01 in the message display 304). The first message 306 from User 1 to User 2 contains a "typo" (i.e., "documents" is incorrectly spelled "documentss"). The first message 306 also refers to an attachment, but the first message 306 does not include an attachment. Typical messaging platforms would require User 1 to send another message (or two) to User 2 in order to correct the typo and/or include the referenced attachment.

The messaging platform described herein, however, advantageously allows User 1 to edit the first message 306 to User 2 without an additional message appearing in User 2's inbox. This can be accomplished, for example, by clicking on the first message 306, which allows User 1 to edit the first message 306. User 1 can then fix the typo and include the referenced attachment. User 1 can then send a revised, second message 308 to User 2, as shown in FIG. 3B.

FIG. 3B shows that in the second message 308 the typo has been corrected and a first attachment (illustrated as "Attachment_1.pdf" in FIG. 3B) has been included. FIG. 3B also shows that the folder 302 only has one message from User 1 to User 2. The second message 308 shows that the message was at 1:01 PM even though it was revised and sent at 1:04 PM as shown by timestamp 310. As a result, when User 2 reads the second message 308 there is no indication that User 1 sent the first message 306.

FIG. 3C shows a third message 312 which is a revised version of the second message 308. Compared to the second message 308, the third message 312 has been edited to change "document" to "documents" in the body of the third message 312 and to include a second attachment (e.g., illustrated as "Attachment_1.docx" in FIG. 3C). The third message 312 shows that the message was at 1:01 PM even though it was revised and sent at 1:07 PM as shown by timestamp 314.

Figure 3D:
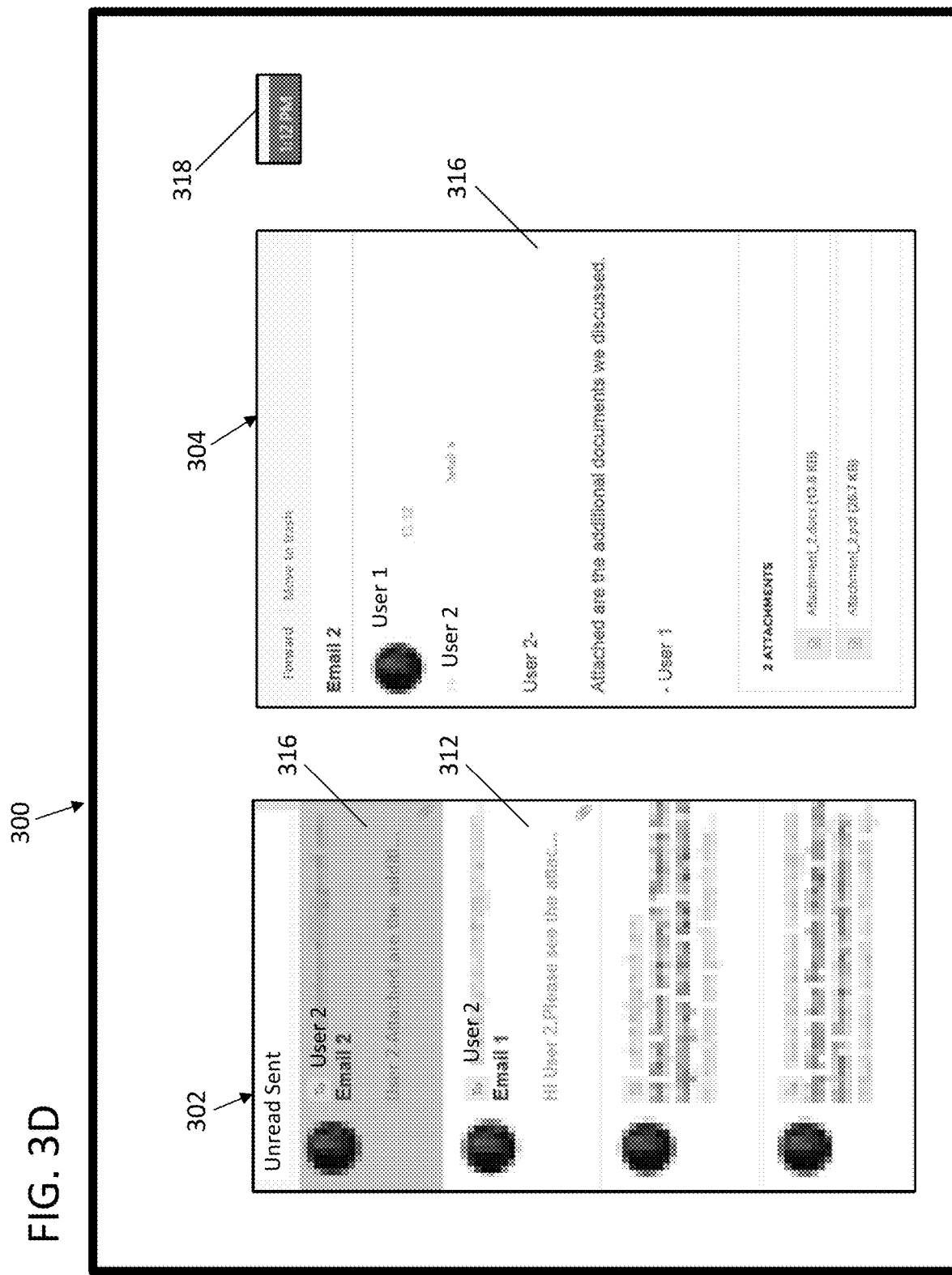

FIG. 3D shows a fourth message 316 which is separate from and subsequent to the messages 306, 308, 312. For example, the message display 304 and the timestamp 318 illustrate that the fourth message 316 was sent at 1:12 PM.

Figure 3E:
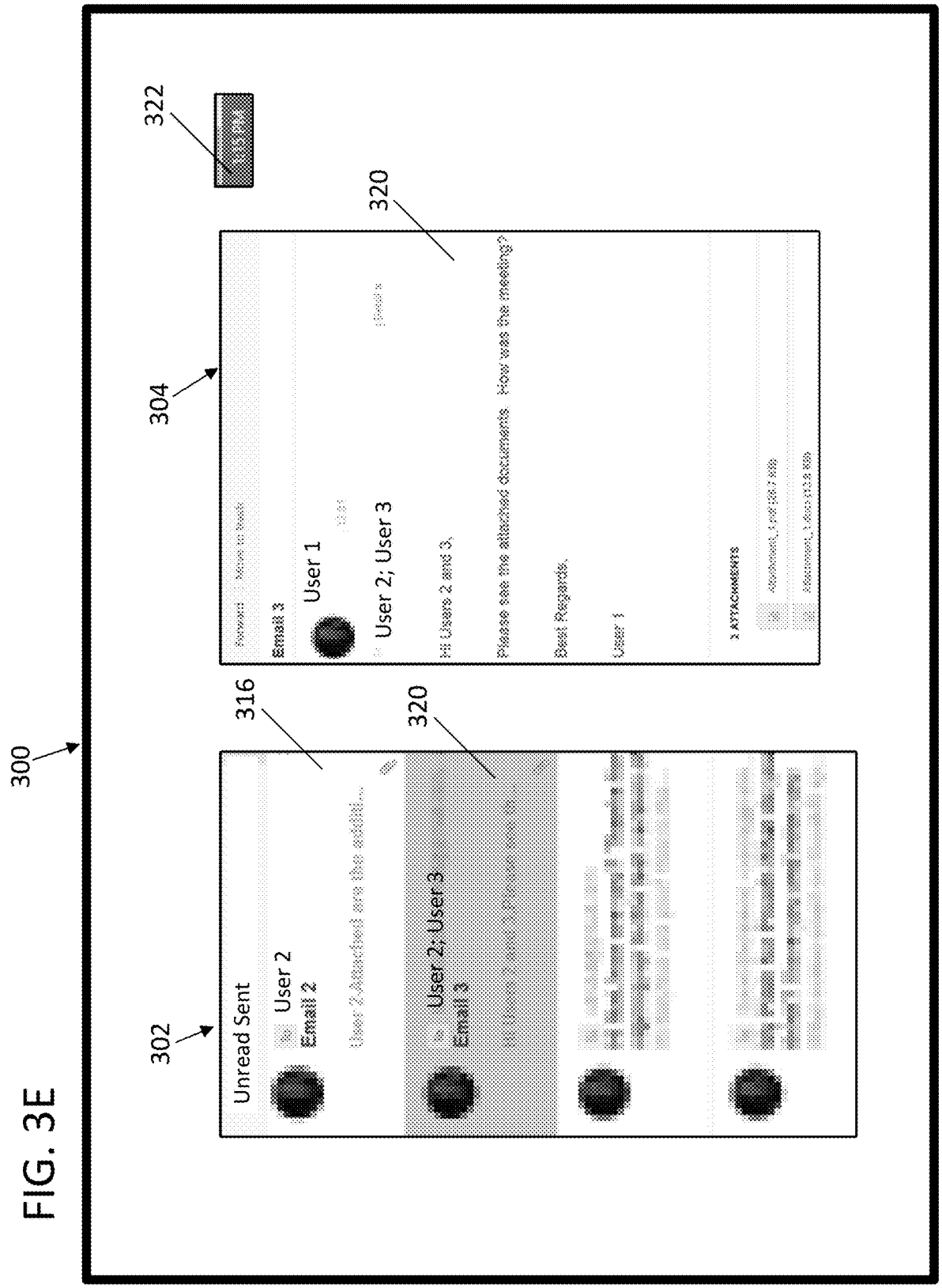
Figure 3F:
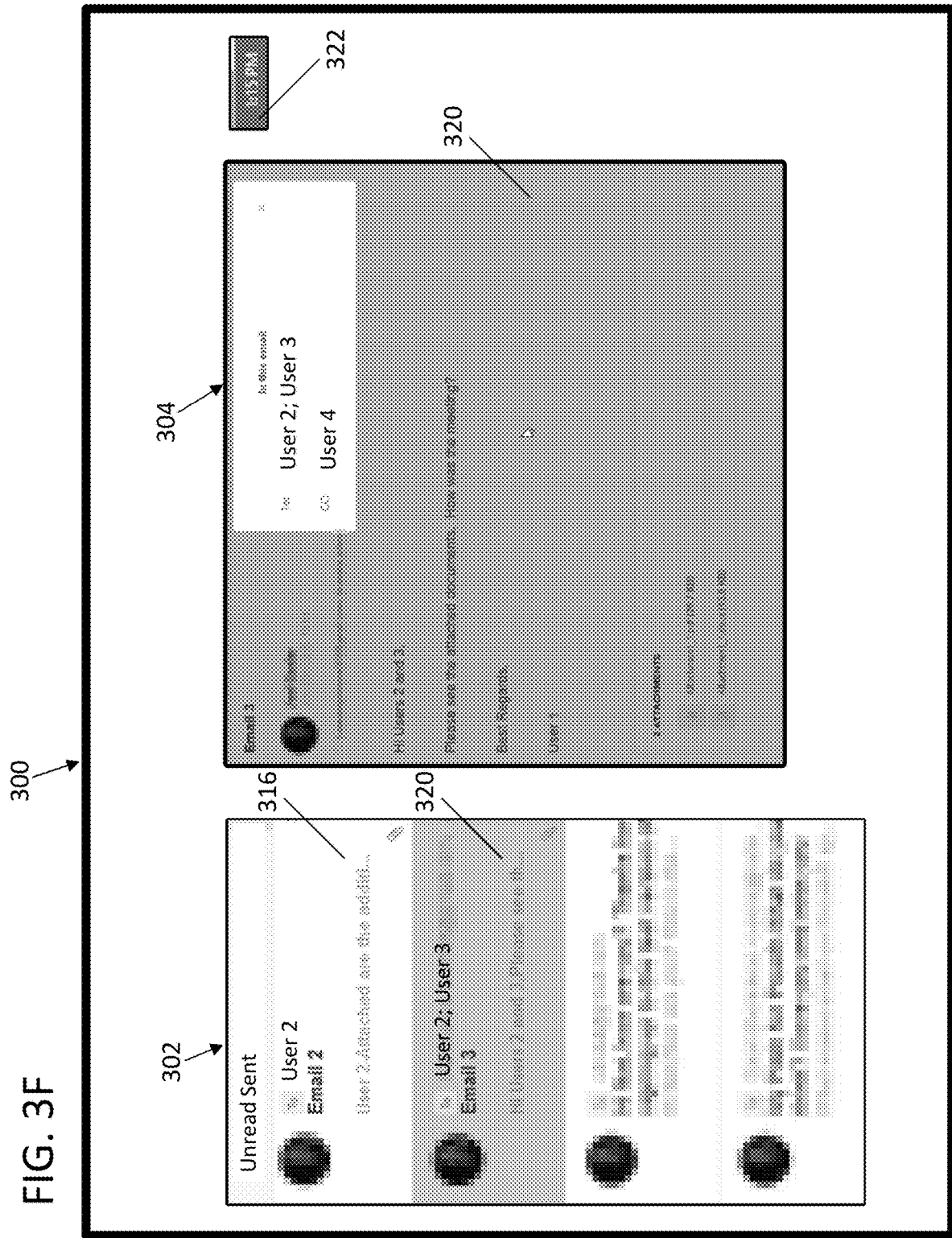

FIGS. 3E-3F illustrates a fifth message 320 which is a revised version of the third message 312. Compared to the third message 312, the fifth message 320 changes the Subject from "Email 1" to "Email 3" and adds User 3 as a "To" recipient and User 4 (FIG. 3F) as a "Cc" recipient. The fifth message 320 was sent at 1:15 PM as illustrated by timestamp 322, but the message 320 still indicates that the message was sent at 1:01 PM (i.e., the time that the first message 306 was sent). As also shown in FIGS. 3E-3F, the fifth message 320 retains the position of the third message 312 relative to the other messages (e.g., the fourth message 316) in the folder 302.

FIG. 4 illustrates a system 400 configured for composing and/or sending messages as illustrated by process block 402 and for editing and/deleting messages as illustrated by process block 404. The system 400 can be configured to interact with a plurality of devices (e.g., computers, smartphones, tablets, etc.) and can be configured such that a user can compose and/or send a message from one device (e.g., a computer) and edit and/or delete the message from another device. For example as shown in FIG. 4, User 1 can use a computer 408 and/or a smartphone 410 to compose and/or send a message to User 2 who can view and/or reply to the message (illustrated in process block 406) on a computer 412. User 1 can also use the computer 408 and/or the smartphone 410 to edit and/or delete the message to User 2. As such, the system 400 provides significant advantages over typical systems which only allow users to edit a message on the device from which the message was sent.

Figure 5:
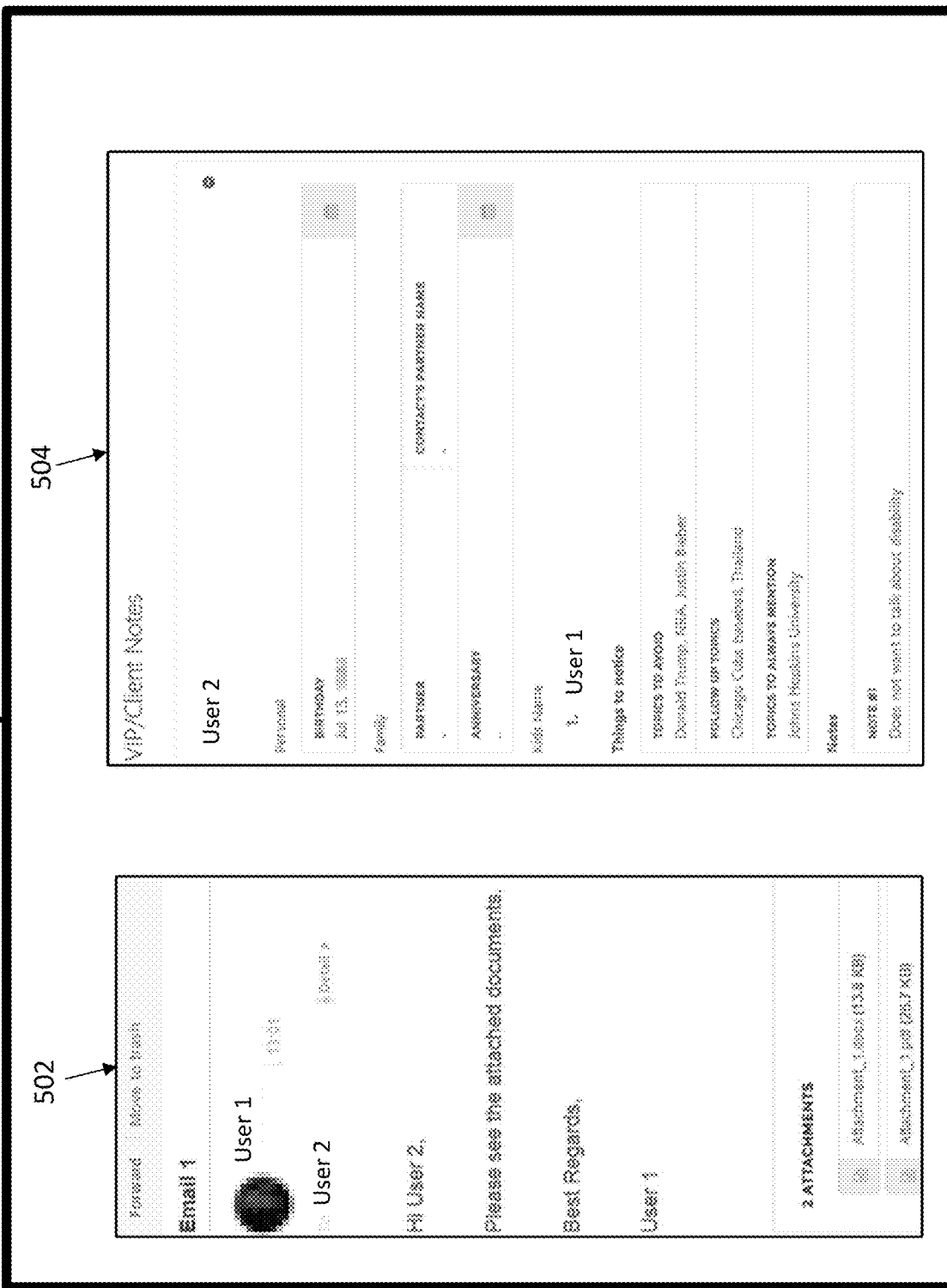
FIG. 5 is an example of a user interface demonstrating various features of a system capable of displaying information about a recipient while a user is composing an electronic message.

FIG. 5 illustrates a user interface 500. The user interface 500 can comprise a message display 502 and an information display 504. The information display 504 can be displayed when a user is composing, editing, and/or replying to a message. A user can access the information display, for example, by clicking or touching a "Notes" icon or button in the message display 502. The information display 504 can include information and/or notes about a recipient of the message. For example, the notes can include birthday, family information (e.g., names of partner and/or children), anniversary, things to notice, topics to avoid, follow-up topics, topics to always mention, as well as a general notes section.

Figure 6:
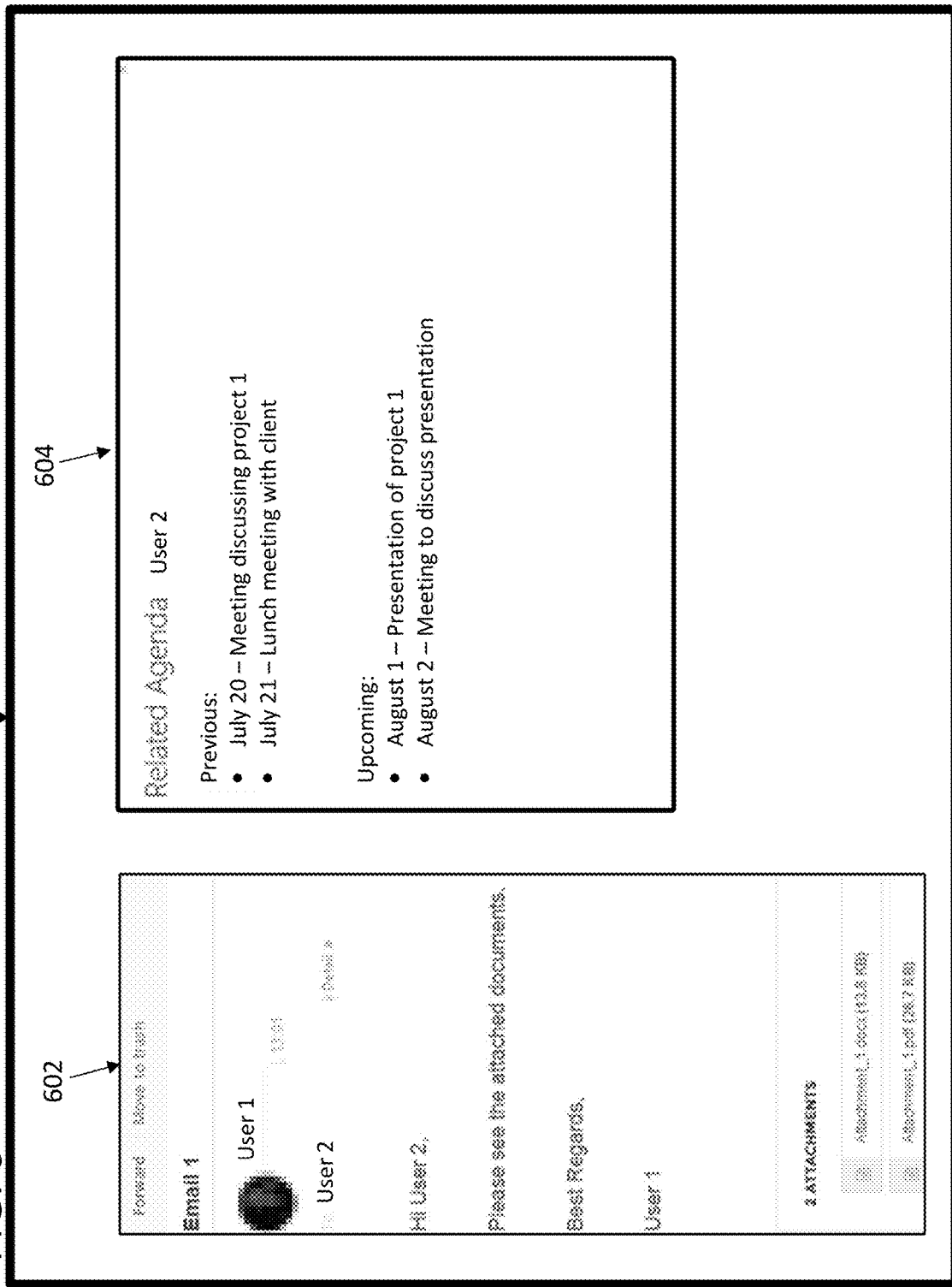
FIG. 6 is an example of a user interface demonstrating various features of a system capable of displaying information about events related to a recipient while a user is composing an electronic message.

FIG. 6 illustrates a user interface 600. The user interface 600 can comprise a message display 602 and an information display 604. The information display 604 can be displayed when a user is composing, editing, and/or replying to a message. A user can access the information display 604, for example, by clicking or touching an "Agenda" icon or button in the message display 602. The information display 604 can include information about previous and/or upcoming events or meetings related to a recipient of the message. For example, the user can enter details about upcoming meetings, and the details can be displayed in the information display 604. In particular examples, the information display 604 can also include other meeting information such as title, start and end date, start and finish time, reoccurrence (e.g., daily, weekly, monthly, yearly), location (which, in some examples, can be integrated with mapping software and/or a mapping service, priority (e.g., very high, high, medium, low), alerts (e.g., at time of the event, 5 minutes before, 30 minutes before, a hour before, a day before, a week before, etc.), description of the meeting, and/or the contacts involved.

Computing Systems

Figure 7:
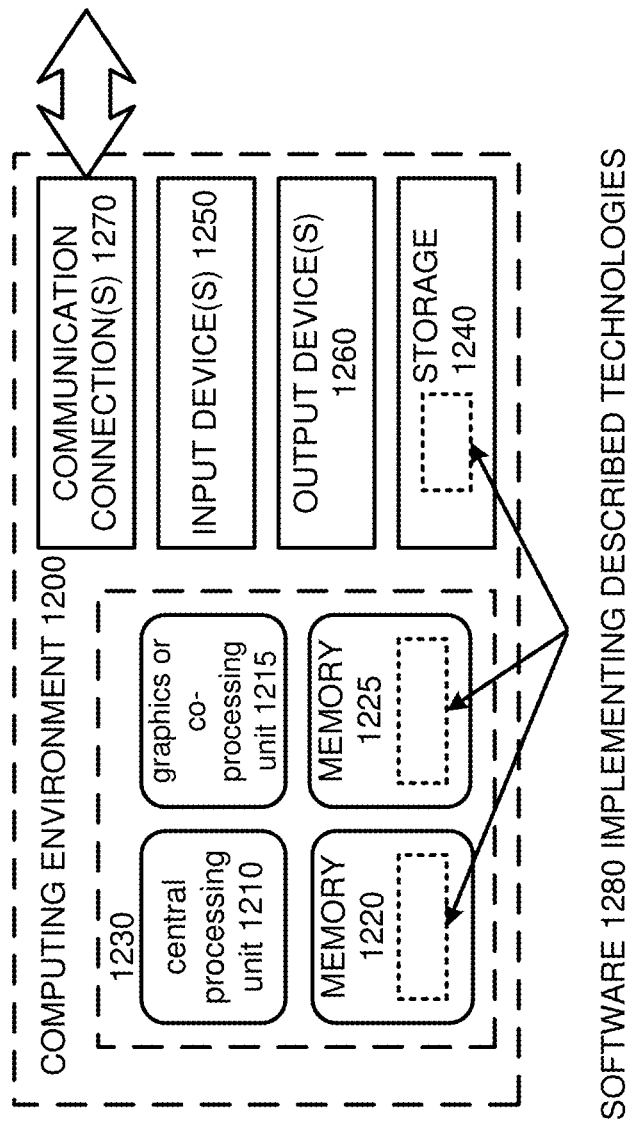
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems. For example, the computing devices 308, 312 can be configured similar to the computing system 700.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 8:
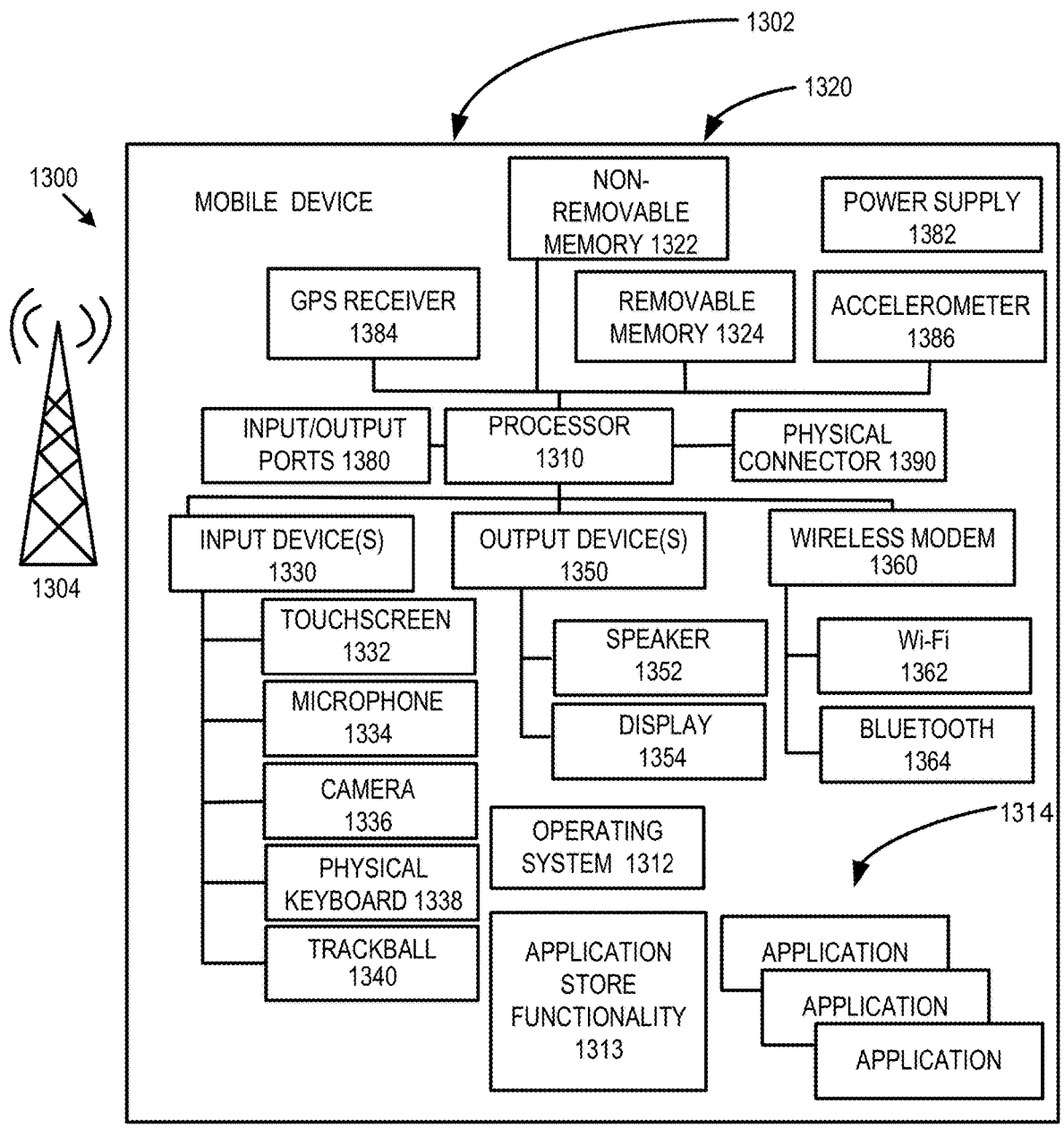
FIG. 8 is an example mobile device that can be used in conjunction with the technologies described herein.

FIG. 8 illustrates a generalized an example of a mobile device 800 in which the described innovations may be implemented. For example, the smartphone 310 can be configured similar to the mobile device 800.

The mobile device 800 can include a variety of optional hardware and software components, shown generally at 802. Any components 802 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 804, such as a cellular, satellite, or other network.

The illustrated mobile device 800 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components 802 and support for one or more application programs 814. The application programs can include common mobile computing applications (e.g., email applications, calendars, contact managers, web browsers, messaging applications), or any other computing application. Functionality 813 for accessing an application store can also be used for acquiring and updating application programs 814.

The illustrated mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in GSM communication systems, or other well-known memory storage technologies, such as "smart cards." The memory 820 can be used for storing data and/or code for running the operating system 812 and the applications 814. Example data can include web pages, text, images, sound files, video data, or other data sets to be sent to and/or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 800 can support one or more input devices 830, such as a touchscreen 832, microphone 834, camera 836, physical keyboard 838 and/or trackball 840 and one or more output devices 850, such as a speaker 852 and a display 854. Other possible output devices (not shown) can include piezoelectric or other haptic output devices. Some devices can serve more than one input/output function. For example, touchscreen 832 and display 854 can be combined in a single input/output device.

The input devices 830 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can comprise input devices and software that allows for user interaction via a user's spatial gestures, such as detecting and interpreting gestures to provide input to a gaming application.

A wireless modem 860 can be coupled to an antenna (not shown) and can support two-way communications between the processor 810 and external devices, as is well understood in the art. The modem 860 is shown generically and can include a cellular modem for communicating with the mobile communication network 804 and/or other radio-based modems (e.g., Bluetooth 864 or Wi-Fi 862). The wireless modem 860 is typically configured for communication with one or more cellular networks, such as a GSM network for data and voice communications within a single cellular network, between cellular networks, or between the mobile device and a public switched telephone network (PSTN).

The mobile device can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components 802 are not required or all-inclusive, as any components can be deleted and other components can be added.

Cloud-Supported Environment

FIG. 9 illustrates a generalized example of a suitable cloud-supported environment 900 in which described embodiments, techniques, and technologies may be implemented. In the example environment 900, various types of services (e.g., computing services) are provided by a cloud 910. For example, the cloud 910 can comprise a collection of computing devices, which may be located centrally or distributed, that provide cloud-based services to various types of users and devices connected via a network such as the Internet. The implementation environment 900 can be used in different ways to accomplish computing tasks. For example, some tasks (e.g., processing user input and presenting a user interface) can be performed on local computing devices (e.g., connected devices 930, 940, 950) while other tasks (e.g., storage of data to be used in subsequent processing) can be performed in the cloud 910.

In example environment 900, the cloud 910 provides services for connected devices 930, 940, 950 with a variety of screen capabilities. Connected device 930 represents a device with a computer screen 935 (e.g., a mid-size screen). For example, connected device 930 could be a personal computer such as desktop computer, laptop, notebook, netbook, or the like. Connected device 940 represents a device with a mobile device screen 945 (e.g., a small size screen). For example, connected device 940 could be a mobile phone, smart phone, personal digital assistant, tablet computer, and the like. Connected device 950 represents a device with a large screen 955. For example, connected device 950 could be a television screen (e.g., a smart television) or another device connected to a television (e.g., a set-top box or gaming console) or the like. One or more of the connected devices 930, 940, 950 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 900. For example, the cloud 910 can provide services for one or more computers (e.g., server computers) without displays.

Services can be provided by the cloud 910 through service providers 920, or through other providers of online services (not depicted). For example, cloud services can be customized to the screen size, display capability, and/or touchscreen capability of a particular connected device (e.g., connected devices 930, 940, 950).

In example environment 900, the cloud 910 provides the technologies and solutions described herein to the various connected devices 930, 940, 950 using, at least in part, the service providers 920. For example, the service providers 920 can provide a centralized solution for various cloud-based services. The service providers 920 can manage service subscriptions for users and/or devices (e.g., for the connected devices 930, 940, 950 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 7, computer-readable storage media include memory 720 and 725, and storage 740. By way of example and with reference to FIG. 8, computer-readable storage media include memory and storage 820, 822, and 824. The term computer-readable storage media does not include signals and carrier waves. In addition, the term computer-readable storage media does not include communication connections (e.g., 770, 860, 862, and 864).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are only examples of the technology and should not be taken as limiting the scope of the present disclosure. Rather, the scope of the invention is defined by the following claims.

The invention claimed is:

1. An electronic messaging system comprising:
   at least one processor; and
   an application configured to, when executed by the at least one processor, cause the system to:
   send an electronic message from a sender electronic messaging account to a recipient electronic messaging account;

receive, from the sender electronic messaging account, instructions to modify the sent electronic message;

based at least on the instructions to modify the sent electronic message, modify the sent electronic to create an edited electronic message;

based at least on data related to a relative location of the sent electronic message in a recipient inbox associated with the recipient electronic messaging account, replace the sent electronic message in the recipient inbox with the edited electronic message, wherein the edited electronic message is placed at a same relative location in the recipient's inbox as the sent electronic message;

receive, from the sender electronic messaging account, instructions to delete the edited electronic message; and based at least on the instructions to delete the edited electronic message, delete the edited electronic message from the recipient inbox.

2. The system of claim 1, wherein the application is further configured to, when executed by the at least one processor, cause the system to:

store a copy of the edited electronic message in an unread storage location within the sender electronic messaging account, wherein the deletion of the edited electronic message is further based on identification that the copy of the edited electronic message is stored in the unread storage location.

3. The system of claim 2, the application is Briber configured to, when executed by the at least one processor, cause the system to:

receive data indicative of a read by recipient status of the edited electronic message; and based at least on the data indicative of the read by recipient status of the edited electronic message:

store the copy of the edited electronic message in a read storage location within the sender electronic messaging account; and delete the copy of the edited electronic message from the unread storage location.

4. The system of claim 3, wherein the application is further configured to, when executed by the at least one processor, cause the system to, based on identification that the copy of the edited electronic message is stored in the unread storage location, prevent each of deletion and further edit of the edited electronic message.

5. The system of claim 1, wherein the instructions to modify the sent electronic message comprise instructions to remove at least one attachment; and wherein the modification of the sent electronic message comprises removal of the at least one attachment from the sent electronic message to create the edited electronic message.

6. The system of claim 1, wherein the instructions to modify the sent electronic message comprise instructions to add at least one attachment; and wherein the modification of the sent electronic message comprises addition of the at least one attachment to the sent electronic message to create the edited electronic message.

7. The system of claim 1, wherein the instructions to modify the sent electronic message comprise instructions to modify a recipient list associated with the sent electronic message; and wherein the modification of the sent electronic message comprises one or more of adding a first recipient or removing a second recipient to the recipient list of the sent electronic message to create the edited electronic message.

8. The system of claim 1, wherein the instructions to modify the sent electronic message comprise instructions to modify text of the sent electronic message; and wherein the modification of the sent electronic message comprises modification of the text of the sent electronic message to create the edited electronic message.

9. The system of claim 1, wherein the data related to the relative location of the sent electronic message comprises a timestamp associated with the sent electronic message, and wherein the replacement the sent electronic message with the edited electronic message in the recipient inbox comprises:

associating the timestamp to the edited electronic message and saving the edited electronic message in the recipient inbox; and deleting the sent electronic message from the recipient inbox.

10. The system of claim 1, wherein the application is a messaging application configured for use on a smartphone.

11. The system of claim 1, wherein the application is a messaging application configured for use on a computer.

12. An electronic messaging system, the system comprising:

at least one processor; and an application configured to, when executed by the at least one processor, cause the system to:

send an electronic message from a sender electronic messaging account to a recipient electronic messaging account;

store a copy of the sent electronic message in an unread storage location within the sender electronic messaging account;

receive, from the sender electronic messaging account, instructions to delete the sent electronic message;

based at least on the instructions to delete the sent edited electronic message and identification that the sent electronic message is stored in the unread storage location, delete the electronic message from the recipient inbox;

based at least on data indicative of a read by recipient status of the sent electronic message:

store the copy of the sent electronic message in a read storage location within the sender electronic messaging account; and delete the copy of the sent electronic message from the unread storage location;

and based at least on an identification that the copy of the sent electronic message is stored in the read storage location, disable deletion of the sent electronic message from the recipient inbox.

13. The system of claim 12, wherein the deletion of the sent electronic message from the recipient inbox occurs without generation of a notice of deletion to a user associated with the recipient electronic messaging account.

14. The system of claim 12, wherein the application is a messaging application configured for use on a smartphone.

15. The system of claim 12, wherein the application is a messaging application configured for use on a computer.

16. One or more computer-readable storage media storing one or more computer-executable instructions for an electronic messaging system, the one or more computer-executable instructions configured to, when executed on a processor apparatus, cause the electronic messaging system to:

send an electronic message from a sender electronic messaging account to a recipient electronic messaging account;

store a copy of the sent electronic message in an unread storage location within the sender electronic messaging account;

receive, from the sender electronic messaging account, instructions to delete the sent electronic message;

based at least on the instructions to delete the sent electronic message and identification that the sent electronic message is stored in the unread storage location, delete the electronic message from the recipient inbox;

based at least on data indicative of a read by recipient status of the sent electronic message:
  store the copy of the sent electronic message in a read storage location within the sender electronic messaging account; and
  delete the copy of the sent electronic message from the unread storage location; and
  based at least on an identification that the copy of the sent electronic message is stored in the read storage location, disable deletion of the sent electronic message from the recipient inbox.

17. The one or more computer-readable storage media of claim 16, wherein the deletion of the sent electronic message from the recipient inbox occurs without generation of a notice of deletion to a user associated with the recipient electronic messaging account.

18. The one or more computer-readable storage media of claim 16, wherein the one or more computer-executable instructions are further configured to, when executed on a processor apparatus, cause the electronic messaging system to:

receive, from the sender electronic messaging account, instructions to modify the sent electronic message;

based at least on the instructions to modify the sent electronic message and identification that the sent electronic message is stored in the unread storage location, modify the sent electronic to create an edited electronic message; and cause replacement of the sent electronic message with the edited electronic message in a same relative location as the sent electronic message within the recipient inbox.

\* \* \* \* \*

UNITED STATES PATENT AND TRADEMARK OFFICE
CERTIFICATE OF CORRECTION

PATENT NO.         : 11,895,076 B2                                         Page 1 of 1
APPLICATION NO.    : 18/050221
DATED              : February 6, 2024
INVENTOR(S)        : Joel Goslar It is certified that error appears in the above-identified patent and that said Letters Patent is hereby corrected as shown below:

In the Claims

Column 14, Line 13, Claim 9, "the replacement the sent" should read --the replacement of the sent--.

Signed and Sealed this
Ninth Day of July, 2024

Katherine Kelly Vidal
*Director of the United States Patent and Trademark Office*